No. 740,091. Patented September 29, 1903.

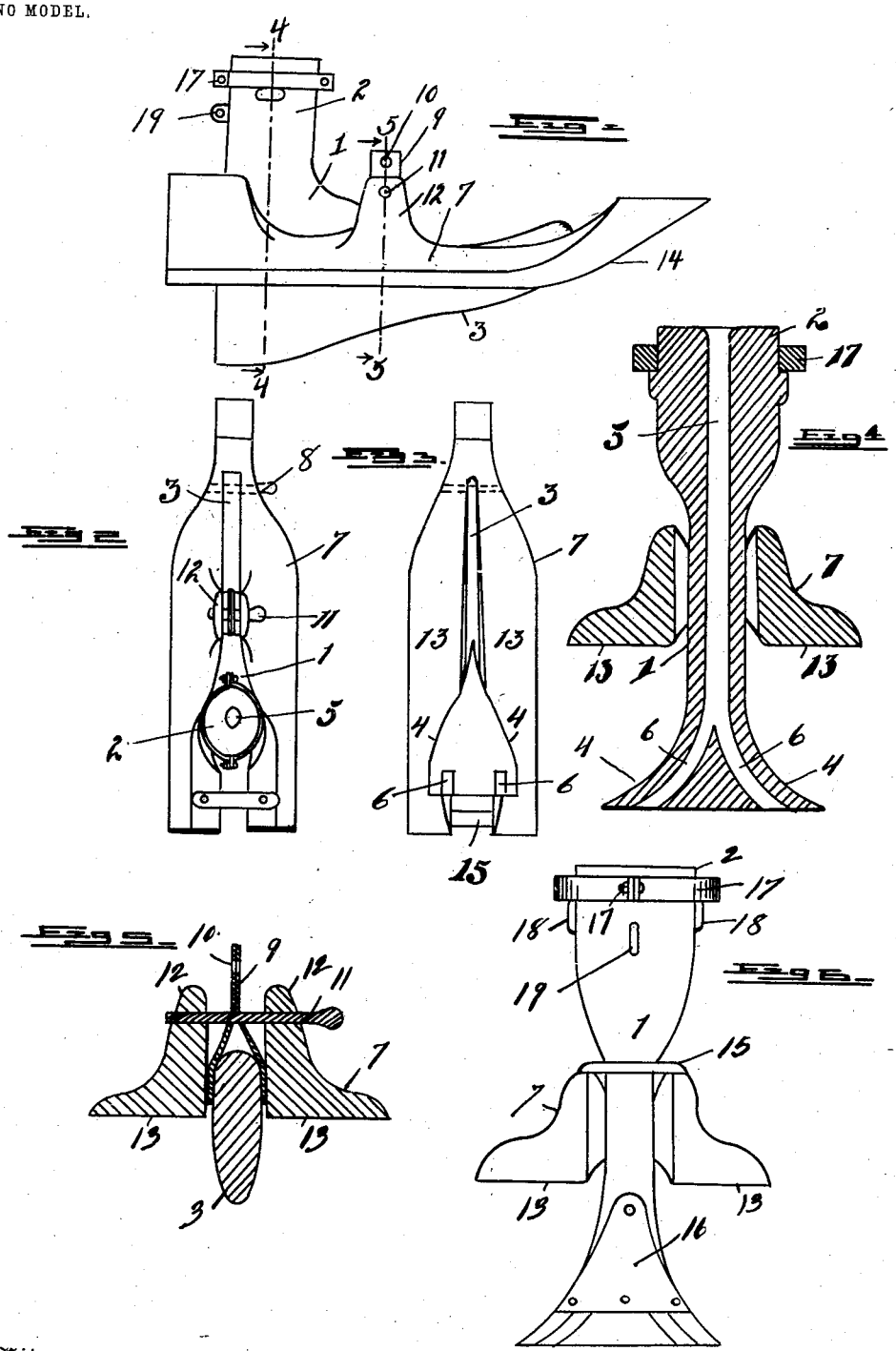

UNITED STATES PATENT OFFICE.

RILEY COLE, OF HUDSON, MICHIGAN.

GRAIN-DRILL.

SPECIFICATION forming part of Letters Patent No. 740,091, dated September 29, 1903.

Application filed June 27, 1903. Serial No. 163,429. (No model.)

*To all whom it may concern:*

Be it known that I, RILEY COLE, a citizen of the United States, residing at Hudson, in the county of Lenawee, State of Michigan, have invented certain new and useful Improvements in Grain-Drills; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to grain-drills; and it consists in the construction and arrangement of parts hereinafter fully set forth, and pointed out particularly in the claims.

The object of the invention is to provide a grain-drill shoe wherein the arrangement is such as to regulate the depth at which the seed may be planted, to deposit the seed in two parallel rows, and to provide for properly covering the seed as the runner of the shoe passes through the ground.

The above object is attained by the structure illustrated in the accompanying drawings, in which—

Figure 1 is a side elevation of a grain-drill shoe embodying my invention. Fig. 2 is a plan view thereof. Fig. 3 is an inverted plan. Fig. 4 is an enlarged vertical section as on line 4 4 of Fig. 1. Fig. 5 is a vertical section as on line 5 5 of Fig. 1. Fig. 6 is an enlarged rear elevation.

Referring to the characters of reference, 1 designates the shoe, to the upper portion of which the boot 2 is connected. The runner or furrow-opener 3 of the shoe is inclined and narrow at its forward end, while the rear of the runner flares outwardly in opposite directions, as at 4, forming outwardly-curved moldboards which undercut the soil and which are of such shape as to cause the soil to fall over the rear end thereof, so as to fill the furrow made by the travel of the runner through the ground.

Extending downwardly through the boot and the rear portion of the shoe is the grain-channel 5, through which the grain passes from the hopper. (Not shown.) This grain-channel at its lower end is divided into curved branches 6, which diverge from the main channel and open through the bottom of the shoe under the flaring sides of the runner. By this arrangement the grain is equally divided and is deposited in parallel rows in the furrow, the point of discharge of the grain being under the curved flaring sides of the runner, so that the earth which falls from said curved sides over the rear of the runner perfectly covers the grain deposited in the furrow. By dividing the seed and planting it in parallel rows the probability of a thrifty growth is materially increased.

The shoe proper is pivoted between the sides of a bifurcated gage-frame 7, which is fixed in any suitable manner to the draw-bar. (Not shown.) The pivot upon which the shoe is adapted to move or swing vertically within said frame comprises a pin 8, which passes through the sides of the frame and through the forward end of the runner 3 of the shoe.

Secured to the top of the runner is a metal strap 9, having apertures 10 therethrough, through which a pin 11 is adapted to pass, the ends of which are supported in the vertical ears 12 upon each side of the frame 7. The bottom of the frame 7 is flat, as shown at 13, and affords a firm bearing upon the ground, serving as a gage to regulate the depth at which the tooth or runner of the shoe may enter the soil. By means of the apertures 10 in the strap 9 the shoe may be adjusted within the frame to regulate the depth at which the grain may be planted, according to the character and conditions of the ground.

The forward end of the gage-frame 7 is turned upwardly, as at 14, to give it the shape of a runner, so that it may the more readily pass over the surface of the ground.

The rear ends of the sides of the bifurcated gage-frame are connected by a cross-bar 15, whereby they are strengthened and prevented from springing. Upon the rear of the shoe is a removable plate 16, which affords access to the branches of the grain-channel for the purpose of cleaning them should they become clogged.

For the purpose of varying the weight upon the shoe according to the conditions of the ground weighted rings 17 may be employed, the sections of which are detachably united at their ends to enable them to slip onto the boot 2, whereon they are supported by the projecting shoulders 18. To afford means for raising the shoe, there is provided at the rear thereof an eye 19, into which a chain may be hooked, as will be understood.

Having thus fully set forth my invention, what I claim as new, and desire to secure by Letters Patent, is—

1. In a grain-drill, the combination of the shoe, having a runner adapted to enter the soil provided with a flaring rear end and flat bottom, said shoe having a grain-channel passing therethrough, which channel at its lower end is divided into independent laterally-curved branches whose ends open through the bottom of the runner adjacent the outer edges of said flaring sides.

2. In a grain-drill, the combination of the integral rigid gage-frame, the shoe pivoted at its forward end between the sides of said frame, means for affording a vertical adjustment of said shoe upon its pivot, said shoe being provided with a flaring runner adapted to enter the soil and having a grain-channel passing therethrough and discharging below the surface of the soil.

3. In a grain-drill, the combination of the fixed gage-frame having bearing-faces at the sides, a grain-shoe pivoted between the sides of said frame at its forward end, a strap attached to said shoe, ears upon said frame in alinement with said strap, and a pin adapted to pass through the strap and ears to hold the shoe in position.

4. In a grain-drill, a shoe having means for regulating the depth at which it may enter the ground, said shoe having a runner provided with a thin forward portion and a laterally-flaring rear portion, and also having a grain-channel passing vertically therethrough, which channel at its lower end is divided to form diverging branches, the lower ends of which pass through the bottom of the runner at a considerable distance on each side of the center of the shoe.

In testimony whereof I sign this specification in the presence of two witnesses.

RILEY COLE.

Witnesses:
PERCY J. DILLON,
JAMES B. THORN.